(12) United States Patent
Angus

(10) Patent No.: US 8,930,505 B2
(45) Date of Patent: Jan. 6, 2015

(54) SELF-CONFIGURING MOBILE ROUTER FOR TRANSFERRING DATA TO A PLURALITY OF OUTPUT PORTS BASED ON LOCATION AND HISTORY AND METHOD THEREFOR

(75) Inventor: Ian Gareth Angus, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 497 days.

(21) Appl. No.: 13/191,220

(22) Filed: Jul. 26, 2011

(65) Prior Publication Data

US 2013/0031223 A1 Jan. 31, 2013

(51) Int. Cl.
*G06F 13/00* (2006.01)
*H04L 12/26* (2006.01)
*H04L 12/24* (2006.01)
*H04L 12/771* (2013.01)
*H04W 84/06* (2009.01)
*H04L 12/721* (2013.01)

(52) U.S. Cl.
CPC ........ *H04L 43/0817* (2013.01); *H04L 41/0813* (2013.01); *H04L 41/085* (2013.01); *H04L 45/56* (2013.01); *H04L 41/5054* (2013.01); *H04L 43/026* (2013.01); *H04W 84/06* (2013.01); *H04L 45/38* (2013.01)
USPC .......................................................... 709/220

(58) Field of Classification Search
CPC .................... H04L 29/08981; H04L 41/0806; H04L 41/12; H04L 29/08072; H04L 29/06
USPC ........................................... 370/401; 709/220
See application file for complete search history.

(56) References Cited

U.S. PATENT DOCUMENTS

| 7,039,053 B1 | 5/2006 | Freed et al. |
| 7,088,727 B1 * | 8/2006 | Short et al. .................... 370/401 |
| 2002/0155833 A1 | 10/2002 | Borel |
| 2007/0097966 A1 | 5/2007 | Scoggins |

OTHER PUBLICATIONS

Mobile Hotspots, Aruna Seneviratne, Eranga Perera and Henrik Petander Nicta, ATP Laboratory, NSW 1430 Australia, School of Electrical Engineering and Telecommunications, UNSW, NSW 2056 Australia, 2007.
Mobile IPv6 Fast Handover Techniques, Cong Hung, Tran and Van T.T. Duong, Post & Telecommunication Institute of Technology, Viet Nam Ton Duc Thang University, Viet Nam, Feb. 13-16, 2011.

* cited by examiner

*Primary Examiner* — Robert B Harrell
(74) *Attorney, Agent, or Firm* — Weiss & Moy, P.C.

(57) ABSTRACT

A self-configuring router for data transfer has a first storage device for storing historic performance and configuration data. A configuration device is coupled to the first storage device for configuring the router based on the performance and configuration data. A data collector is coupled to the configuration device for measuring operational data of the router. An analysis device is coupled to the data collector and the first storage device for analyzing the operational data.

13 Claims, 3 Drawing Sheets

SELF-CONFIGURING MOBILE ROUTER FOR TRANSFERRING DATA TO A PLURALITY OF OUTPUT PORTS BASED ON LOCATION AND HISTORY AND METHOD THEREFOR

BACKGROUND

Embodiments of this disclosure relate generally to a network communication system, and more particularly, to a self-configuring router which may transfer data based on router location, history, or other criteria.

Computer networks may use one or more routers. Routers are devices that may be used to forward data packets across computer networks. The router may be connected to two or more data lines from different computer networks. When data comes in on one of the lines, the router may read the address information in the packet to determine the destination of the data. Using the address information, the router may send the data to the proper location.

Aircraft may have one or more computer networks. The computer networks may perform different applications within the aircraft. Some of these applications may need to transfer data to ground base computer networks. In order to transfer the data to the ground base computer networks, the aircraft may have a router through which the data may have to pass.

These multiple applications may compete for network bandwidth to associated ground systems. A traditional way to solve this would be to prioritize the data to be transferred. However, prioritization scheme may differ depending upon where the aircraft is located. In addition, bottlenecks caused by multiple applications competing for network bandwidth to associated ground systems may not be visible to the aircraft and so the only way for the aircraft to learn of the bottleneck is to measure end-to-end network behavior and adapt using that information.

Therefore, it would be desirable to provide a system and method that overcomes the above problems.

SUMMARY

A self-configuring router for data transfer has a first storage device for storing historic performance and configuration data. A configuration device is coupled to the first storage device for configuring the router based on the performance and configuration data. A data collector is coupled to the configuration device for measuring operational data of the router. An analysis device is coupled to the data collector and the first storage device for analyzing the operational data A self-configuring router for data transfer has a first storage device for storing historic performance and configuration data. A configuration device is coupled to the first storage device for configuring the router. The configuration device configures the router based on the historic performance and configuration data associated with a present location of the router. A data collector is coupled to the configuration device for measuring operational data of the router. An analysis device is coupled to the data collector and the first storage device for analyzing the operational data and for determining new performance and new configuration data.

A method for self configuration of a router comprises: determining a location of the router; retrieving historic performance and configuration data stored in the router associated with the location; and configuring the router based on the historic performance and configuration data stored in the router associated with the location.

The features, functions, and advantages can be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION

Figure 1:
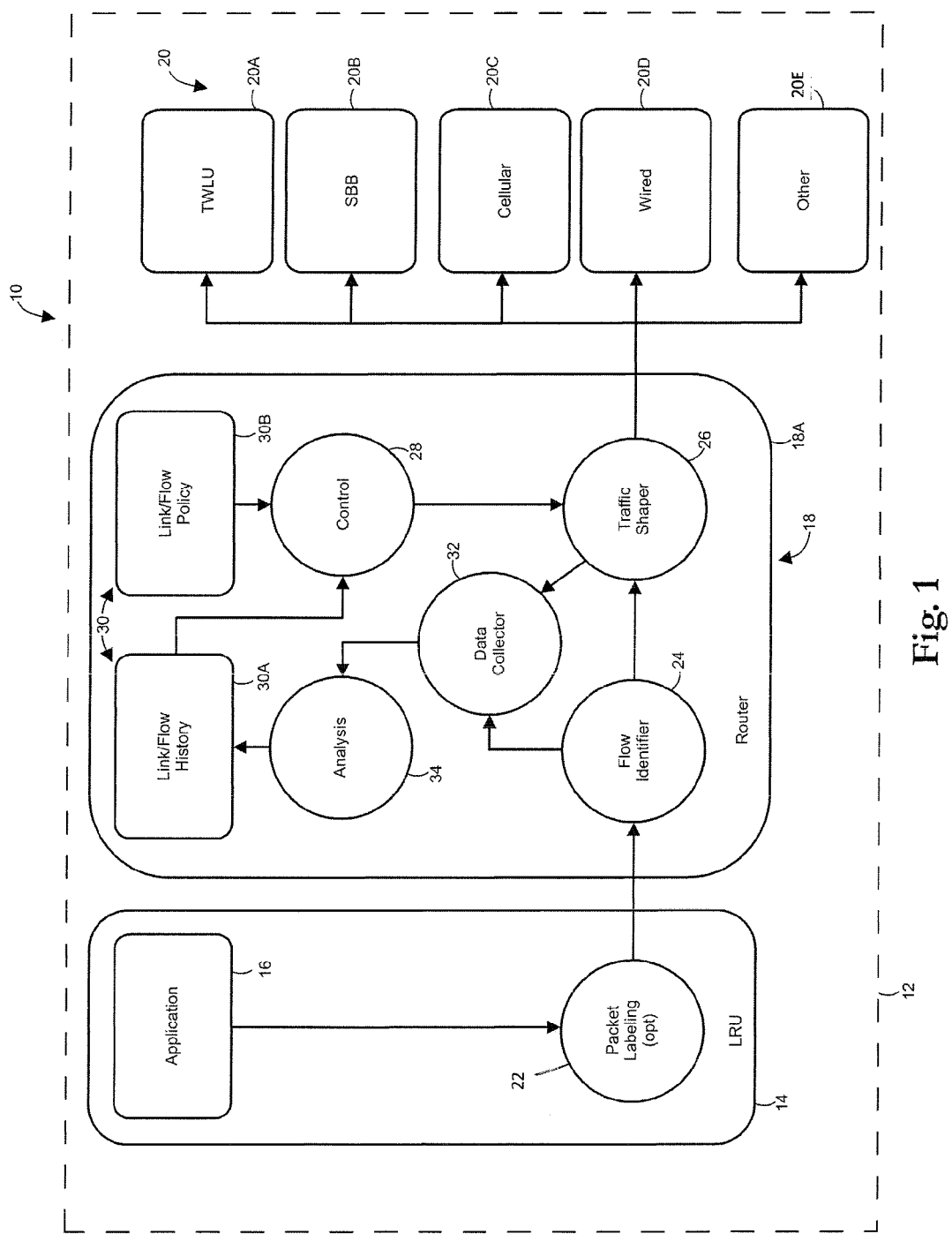
FIG. 1 is a simplified block diagram of a communication system having a self-configuring router.

Referring to FIG. 1, a network system 10 is shown. The network system 10 may be used to transfer data. The network system 10 is described below in regards to a mobile platform wherein the network system 10 is movable. More specifically, the network system 10 is described below in regards to an aircraft network system where the network system 10 is positioned within an aircraft 12. The network system 10 may be used to transfer data from the aircraft 12 to a desired destination. For example, the data may be sent from the aircraft 12 to a ground base location. However, this should not be seen in a limiting manner.

The network 10 may have one or more computers 14. Each of the computers 14 may be programmed to run different applications 16. For an aircraft network system, the computers 14 may run different applications 16 which relate to operation of the aircraft 12 and or which may be used in the operation of the aircraft 12.

The computer 14 may be coupled to one or more routers 18. The routers 18 may be used to transfer data from the computers 14 to a desired destination. In a case where multiple routers 18 may be used, the multiple routers 18 may be configured to communicate with one another. This may allow the routers 18 to coordinate and control and modify the upstream routing of traffic (i.e., inside of the aircraft). In the embodiment shown in FIG. 1, one of the routers 18 may be an edge router 18A. The edge router 18A may be used to transfer date to an off board port 20. The off board port 20 may be communication ports which may be used to transfer data from the aircraft to a ground base destination.

In the embodiment shown in FIG. 1, the edge router 18A may be used to transfer data to one or more off board ports 20. Aircraft may have several different off board ports 20 which may be used to transfer data. As shown in FIG. 1, the edge router 18A may be used to transfer data to a Terminal Wireless LAN Unit (TWLU) port 20A, Swift Broadband (SBB) communication port 20B, a cellular communication port 20C, a wired communication port 20D, or other communication port 20E. The different off board ports 20 shown are given as an example and should not be seen in a limiting manner.

Each of the computers 14 may be running one or more different applications 16. Data generated by the computers 14 may go through a packet labeling process 22. The packet labeling process 22 may be used to add a header to the data packets. The header may contain traffic categorization labels. The categorization labels may contain information such as preferences for the transfer of the data. For example, the header may contain information regarding which off board} port 20 may be preferred for transferring the data off of the aircraft. The information contained in the header is used as described below.

The edge router 18A may be a self-configuring router. Thus, the edge router 18A may use information stored within the edge router 18A to alter the current setting of the edge router 18A in order to prioritize and shape the transfer of the data. For example, the edge router 18A may use information like the present location, and previously observed history and or settings at that location such as the time of day, aircraft at the location, aircraft traffic, past data flows for the time of day and location, and the like, to decide how to prioritize and shape the transfer of the data. The edge router 18A may measure the observed data flow and use these measurements to update history for that location and to adjust the transfer of data from the edge router 18A. Thus, the edge router 18A may not have to rely on the contents of the header in the data for directing the data to the next destination but may use the header information as a way to identify different traffic flows.

The edge router 18A may have a flow identifier 24. The flow identifier 24 may be used to decipher the information in the header attached to the data. Thus, the flow identifier 24 may decipher which source application 16 generated the data flow.

The data from the flow identifier 24 may then be sent to a traffic shaper 26. The traffic shaper 26 may be used adjust the configuration and hence adjust the flow of data out of the edge router 18A. The traffic shaper 26 may alter the route based on information provided to and or stored within the edge router 18A.

The traffic shaper 26 may be coupled to a control device 28. The control device 28 may be used to send signals to the traffic shaper 26. The signals may be used to adjust the configuration and hence how data flows from the edge router 18A.

The control device 28 may be coupled to one or more input devices 30. The input devices 30 may be memory devices which may be used to store information which may be used to configure the edge router 18A. Thus, the information stored in the input devices 30 may be used to decide how to prioritize and shape the transfer of the data.

In the embodiment shown in FIG. 1, the input device 30 may be a Link/Flow History 30A. The Link/Flow History 30A may be statistical data which may be used to decide how to prioritize and shape the transfer of the data. The statistical data may be data previously monitored by the edge router 18A, data uploaded to the edge router 18A from other aircraft, and the like. The statistical data may include but is not limited to data flow rates. For example, the statistical data may be data flow rates related to the present location, and previously observed history and or settings at that location. For mobile platforms, network connectivity may be based on where the network system 10 is located. For example, in an aircraft network system, if the network system 10 is located in the United States, network connectivity via TWLU port 20A may provide a faster connection and may be preferred over other off board ports 20 when transferring data. However, if the network system 10 is located in Asia, network connectivity via TWLU port 20A may not be as satisfactory and other off board ports 20 may provide better connectivity. Thus, since network behavior varies based on where one may be located, the Link/Flow History 30A may provide statistical data which may be used to decide how to configure the edge router 18A in order to prioritize and shape the transfer of data.

One example of the operation of the Link/Flow History 30A may be as follows. The Link/Flow History 30A may indicate that at the present location, during certain times of the day, that the data flow rate at the TWLU port 20A is slow due to heavy usage. Thus, the Link/Flow History 30A may send this information to the control device 28. The control device 28 may then send a signal to the traffic shaper 26 to configure the edge router 18A so that an off board ports 20 other than the TWLU port 20A may be used to transfer data due to the slow connectivity of the TWLU port 20A.

In the embodiment shown in FIG. 1, the input device 30 may be a Link/Flow Policy 30B. The Link/Flow Policy 30B may be procedural data which may be used to decide how to prioritize and shape the transfer of the data. The procedural data may include but is not limited to customer policies. For example, a customer policy may relate to which off board port 20 may be used to download certain data off of the aircraft. Another policy may related to using a specific off board port 20 if the size of the data transfer is less than a certain size and to use a different off board port 20 if greater than a designated size. Thus, certain customer policies may be used to configure the edge router 18A. The above are given as examples and should not be seen in a limiting manner.

Data flow information and statistics collected by the flow identifier 24 and the traffic shaper 26 may be sent to a data collector 32. Data flow information and statistics collected by the flow identifier 24 and the traffic shaper 26 may be the date flow rate out of the edge router 18A, which output ports 20 the data is being sent, and the like. The data flow information and statistics may be sent to an analysis device 34. The analysis device 34 may be used to review the data flow information and statistics and to determine to which output ports 20 may be best for transferring the data based on the time, day, location, etc. The analysis device 34 may use time series analysis or other analysis procedures for the above process. Information extrapolated by the analysis device 34 may be sent to the Link/Flow History 30A where it may be used to configure the edge router 18A and control operation of the traffic shaper as described above.

Figure 2:
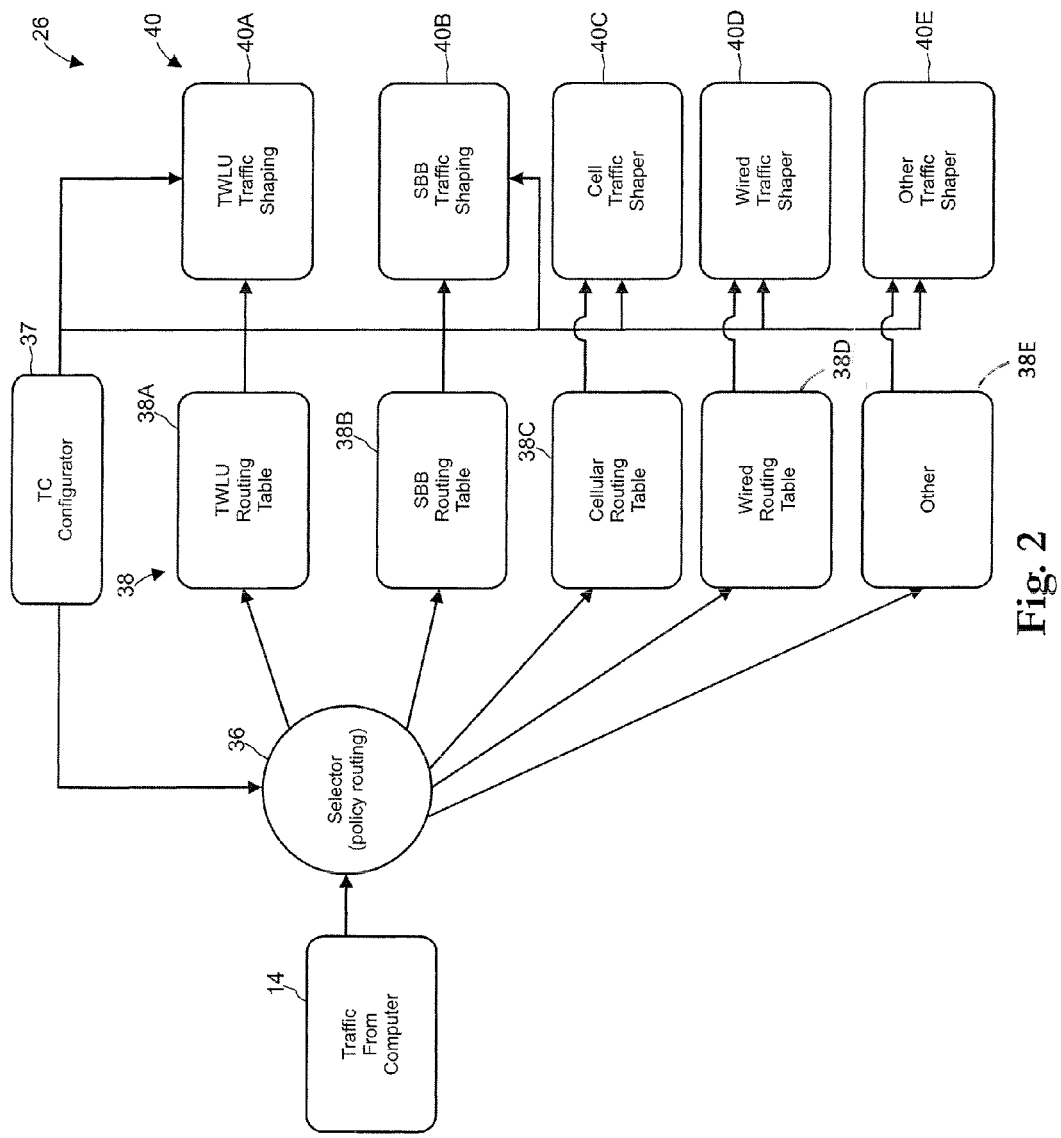
FIG. 2 is a block diagram of the self-configuring router.

Referring now to FIG. 2, a simplified block diagram of the traffic shaper 26 may be shown. The traffic shaper 26 may have a selection mechanism 36. The selection mechanism may be coupled to a Traffic Control (TC) configurator 37. The TC configurator 37 may be coupled to and receives signals from the control device 28. The TC configurator 37 may be used to send signals to the selection mechanism 36. The signals sent to the selection mechanism 36 may be used to select a specific routing table 38 to be used.

As shown in FIG. 2, the traffic shaper 26 may have a plurality of routing tables 38. In the embodiment shown in FIG. 2, the traffic shaper 26 may have a TWLU routing table 38A, an SBB routing table 38B, a wired routing table 38C, a cellular routing table 38D, and other touting table 38E. The above is shown as one example and should not be seen in a limiting manner. The routing tables 38 may be used to generate a route for the transfer of the data.

Each routing table 38 may be coupled to a traffic shaping device 40. Thus, the TWLU routing table 38A may be coupled to a TWLU shaping device 40A, the SBB routing table 38B may be coupled to a SBB shaping device 40B, the wired routing table 38C may be coupled to a wired shaping device 40C, a cellular routing table 38D may be coupled to a cellular shaping device 40D, and the other routing table 38E may be coupled to an other shaping device 40E.

Each of the traffic shaping devices 40 may also be coupled to the TC configurator 38. The TC configurator 37 may be used to send signals to each traffic shaping device 40. The signals from the TC configurator 37 may be used to allow the traffic shaping devices 40 to adjust the flow of data out of each of the routing tables 38 by biasing some flows of data over others based upon the flow identifiers 24 (FIG. 1).

Figure 3:
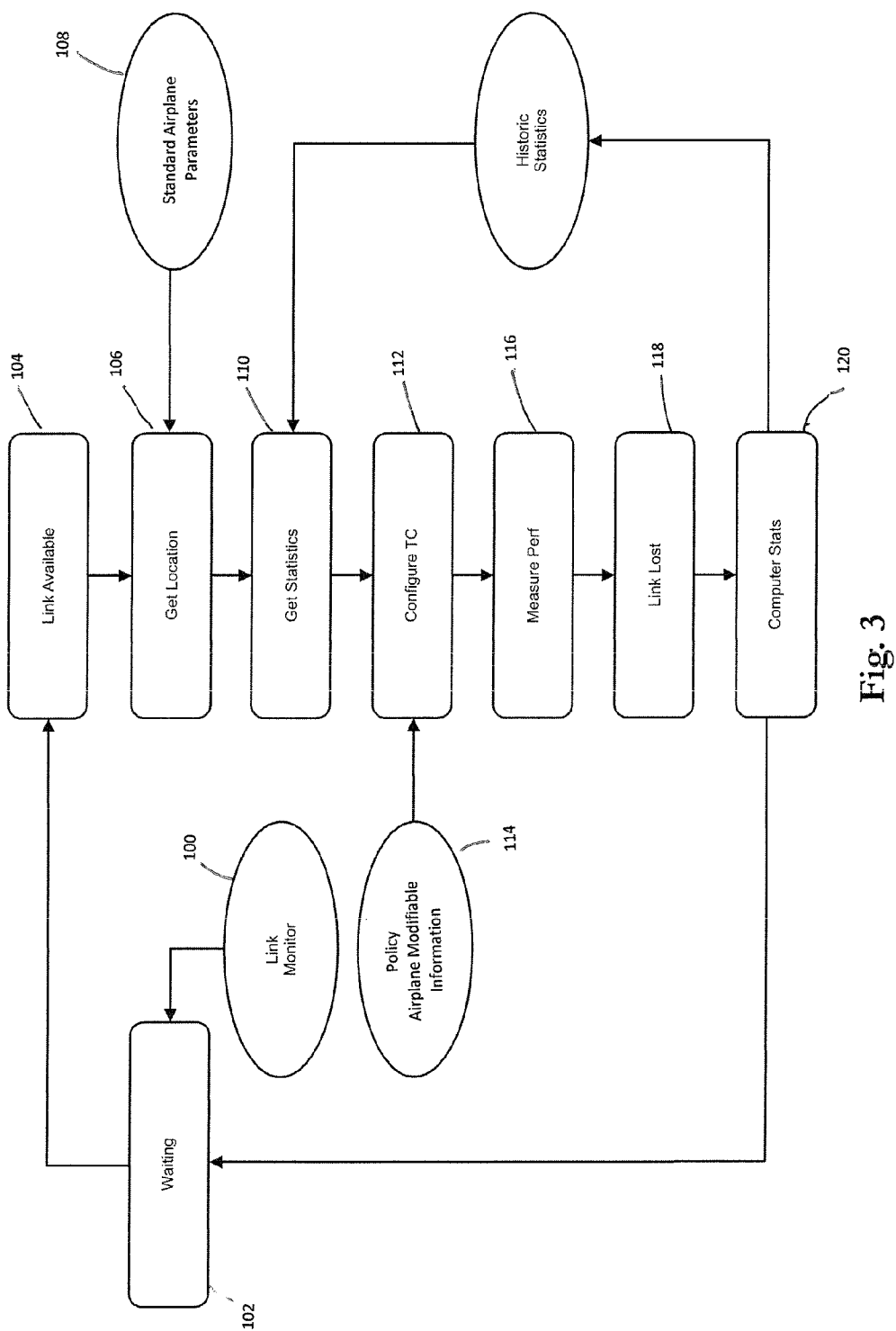
FIG. 3 is a process diagram showing operation of the self-configuring router.

Referring now to FIGS. 1 and 3, the operation of the edge router 18A may be described. The edge router 18A may monitor which output ports 20 are available for transferring data as shown in Step 100. The edge router 18A may be in a wait state 102 during this time. When different output ports 20 become available 104, the edge router 18A may try to determine a current location 106 of where the edge router 18A is located. In the embodiment where the edge router 18A is part of an aircraft network system, the aircraft may be used to determine the present location Step 108 and this information may be sent to the edge router ISA. Once given the current location, the statistical data and or previous settings from that location may be queried step 110. The statistical data and or previous settings may be the data from the Link/Flow History 30A.

Once the statistical data and or previous settings have been obtained, the edge router 18A may be configured step 112. The configuration may be based not only on the statistical data and previous settings obtained, but also on customer policy request step 114. The customer policy request may be obtained from the Link/Flow Policy 30B.

Once the edge router 18A has been reconfigured, the off board router 18A may allow the data to flow. During the transfer of data, the performance of the off board router 18A may be monitored step 116. For example, the data flow rate may be monitored. The performance continues to be monitored until the off board port 20 current being used is closed and or changes.

Once the off board port 20 being used is closed and or changes step 118, the performance data may be sent to the data collector 32 and then sent to the analysis device 34 where the statistical performance of the off board router 18A may be calculated step 120. This information may then be feed back to the Link/Flow History 30A. In accordance with another embodiment, the performance data may be sent to the data collector 32 and then sent to the analysis device 34 where the statistical performance of the off board router 18A may be calculated prior to the closing and or changing of the link. In this embodiment, the statistical performance data calculations may be performed at set intervals, for example, every 10 minutes or the like.

In accordance with one embodiment, the conditions at a given location may become more favorable (for example bandwidth on a particular output port may improve) over time. Thus, the edge router 18A may be designed to periodically set the shaping for a predefined amount. Statistical performance data calculations may be performed at set intervals to determined if additional traffic shaping by the edge router 18A may be desirable.

While embodiments of the disclosure have been described in terms of various specific embodiments, those skilled in the art will recognize that the embodiments of the disclosure can be practiced with modifications within the spirit and scope of the claims.

What is claimed is:

1. A self-configuring router for data transfer comprising:
    a first storage device for storing historic performance data of data flow rates to a plurality of output ports at different locations of the router, the historic performance data used to prioritize the data transfer from the router;
    a data flow identifier for receiving the data transfer and to read header information attached to the data transfer to indicate a desired output port for the data transfer;
    a configuration device coupled to the first storage device for configuring the router to adjust the desired output port of the data transfer based on the historic performance data;
    a data collector coupled to the data flow identifier and to the configuration device for collecting operational data of the router; and
    an analysis device coupled to the data collector and the first storage device for analyzing the operational data and to update the historic performance data stored in the first storage device to determine which output port to use for the data transfer based on the historic performance data and the operational data.

2. A self-configuring router in accordance with claim 1, wherein the configuration device comprises:
    a control unit coupled to the first storage unit; and
    a traffic shaping unit coupled to the control unit for receiving signals from the control unit and configuring the router based on the signals to adjust the desired output port of the data transfer based on the historic performance data.

3. A self-configuring router in accordance with claim 2, wherein the traffic shaping unit comprises:
    a plurality of routing tables;
    a plurality of port shaping units, wherein each port shaping unit is coupled to and associated with a respective output port and is coupled to one of the plurality of routing tables;
    a traffic control configurator coupled to each of the plurality of port shaping units for sending signals to at least one of the plurality of port shaping units to adjust a flow of data out of the at least one port shaping units.

4. A self-configuring router in accordance with claim 3, further comprising a selection device coupled to the traffic control configurator and to each of the plurality of routing tables for sending the data transfer to a selected routing table.

5. A self-configuring router in accordance with claim 1, further comprising a second storage device coupled to the configuration device for storing policy configuration data related to the plurality of output ports.

6. A self-configuring router in accordance with claim 1, wherein the configuration device configures the router based on the historic performance and configuration data related to a present location where the router is positioned.

7. A self-configuring router for data transfer comprising:
    a first storage device for storing historic performance data of data flow rates to a plurality of output ports and configuration data, the historic performance data and configuration data used to prioritize the data transfer from the router to the plurality of output ports;
    a configuration device coupled to the first storage device for configuring the router to adjust a desired output port indicated by the data transfer of the data transfer to an output port based on the historic performance and configuration data associated with a present location of the router;
    a data collector coupled to the configuration device for measuring operational data of the router; and
    an analysis device coupled to the data collector and the first storage device for analyzing the operational data, for determining new configuration data for data transfers from the router based on the historic performance data and configuration data stored in the first storage device and operational data measured from the data collector.

8. A self-configuring router in accordance with claim 7, wherein the configuration device comprises:
    a control unit coupled to the first storage unit; and a traffic shaping unit coupled to the control unit for receiving signals from the control unit and configuring the router based on the signals to adjust the desired output port of the data transfer based on the historic performance data and configuration data associated with the present location of the router.

9. A self-configuring router in accordance with claim 8, wherein the traffic shaping unit comprises:
 a plurality of routing tables;
 a plurality of port shaping units, wherein each port shaping unit is coupled to and associated with a respective output port and is coupled to one of the plurality of routing tables;
 a traffic control (TC) configurator coupled to each of the plurality of port shaping units for sending signals to at least one of the plurality of port shaping units to adjust a flow of data out of the at least one port shaping units.

10. A self-configuring router in accordance with claim 9, further comprising a selection device coupled to the TC configurator and to each of the plurality of routing tables for sending the data transfer to a selected routing table.

11. A self-configuring router in accordance with claim 7, further comprising a second storage device coupled to the configuration device for storing policy configuration data related to the plurality of output ports.

12. A self-configuring router in accordance with claim 11, wherein the configuration device configures the router based on the historic performance and configuration data related to a present location where the router is positioned and the policy configuration data stored in the second storage device.

13. A self-configuring router in accordance with claim 7, further comprising a data flow identifier coupled to the data collector for receiving the data transfer and to read header information attached to the data transfer to indicate a desired output port for the data transfer.

* * * * *